US008889588B2

(12) United States Patent
Moon et al.

(10) Patent No.: US 8,889,588 B2
(45) Date of Patent: Nov. 18, 2014

(54) HIGH-DURABILITY METAL FOAM-SUPPORTED CATALYST FOR STEAM CARBON DIOXIDE REFORMING AND METHOD FOR PREPARING THE SAME

(71) Applicant: Korea Institute of Science and Technology, Seoul (KR)

(72) Inventors: Dong Ju Moon, Seoul (KR); Tae Gyu Kim, Gwangju (KR); Dae Il Park, Gwangju (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 13/909,733

(22) Filed: Jun. 4, 2013

(65) Prior Publication Data

US 2014/0138585 A1    May 22, 2014

(30) Foreign Application Priority Data

Nov. 21, 2012  (KR) ........................ 10-2012-0132551

(51) Int. Cl.

| *B01J 23/00* | (2006.01) |
|---|---|
| *B01J 23/02* | (2006.01) |
| *B01J 23/04* | (2006.01) |
| *B01J 23/70* | (2006.01) |
| *B01J 23/72* | (2006.01) |
| *B01J 20/00* | (2006.01) |
| *B01J 21/04* | (2006.01) |
| *C01B 3/40* | (2006.01) |
| *B01J 23/755* | (2006.01) |

(52) U.S. Cl.
CPC ................ *B01J 23/755* (2013.01); *C01B 3/40* (2013.01); *C01B 2203/0238* (2013.01); *C01B 2203/1058* (2013.01); *C01B 2203/0233* (2013.01); *C01B 2203/1082* (2013.01); *Y10S 502/52724* (2013.01)

USPC ........... 502/335; 502/337; 502/344; 502/345; 502/346; 502/355; 502/415; 502/439; 502/527.24

(58) Field of Classification Search
USPC ......... 502/335, 337, 344–346, 355, 415, 439, 502/527.24
See application file for complete search history.

(56) References Cited

U.S. PATENT DOCUMENTS

| 6,667,270 B2 | 12/2003 | Tanev |
| 6,864,212 B2 | 3/2005 | Tanev |

(Continued)

FOREIGN PATENT DOCUMENTS

| KR | 1020017005646 A | 5/2001 |
| KR | 1020047018719 A | 12/2004 |

(Continued)

OTHER PUBLICATIONS

Eunjeong Choi, et al; "The Performance of Ni/MgAl2O4 coated Metal Monolith in Natural Gas Steam Reforming for Hydrogen Production", Trans. of the Korean Hydrogen and New Energy Society, Dec. 2010; vol. 21 No. 6, pp. 500-506.

*Primary Examiner* — Cam N. Nguyen
(74) *Attorney, Agent, or Firm* — Ladas & Parry LLP

(57) ABSTRACT

Disclosed is a catalyst support for steam carbon dioxide reforming reaction utilizing the advantages of superior thermal conductivity and thermal dispersion of a metal foam support and a large specific surface area of a carrier material, which allows selective control of coating amount and the thickness of a support layer and prevents cracking on the support surface, using both the sol-gel method and the slurry method that have been used for coating of a metal foam support.

8 Claims, 6 Drawing Sheets

Bare Ni foam    Washcoated Ni foam

Ni/Al₂O₃/Ni foam

(56) References Cited

U.S. PATENT DOCUMENTS

| | | | |
|---|---|---|---|
| 7,518,014 B2 | 4/2009 | Kimmich et al. | |
| 7,700,518 B2* | 4/2010 | Wang et al. | 502/325 |
| 2001/0027165 A1* | 10/2001 | Galligan et al. | 502/439 |
| 2002/0128151 A1* | 9/2002 | Galligan et al. | 502/302 |
| 2003/0149120 A1* | 8/2003 | Wang et al. | 518/715 |
| 2003/0165414 A1* | 9/2003 | Galligan et al. | 423/213.2 |
| 2004/0009106 A1* | 1/2004 | Galligan et al. | 422/180 |
| 2005/0163677 A1* | 7/2005 | Galligan et al. | 422/180 |
| 2010/0292074 A1* | 11/2010 | Wang et al. | 502/177 |

FOREIGN PATENT DOCUMENTS

| | | |
|---|---|---|
| KR | 1020077012528 A | 6/2007 |
| WO | 00/23167 A1 | 5/2000 |

* cited by examiner

HIGH-DURABILITY METAL FOAM-SUPPORTED CATALYST FOR STEAM CARBON DIOXIDE REFORMING AND METHOD FOR PREPARING THE SAME

CROSS-REFERENCE TO RELATED APPLICATIONS

This application claims priority under 35 U.S.C. §119 to Korean Patent Application No. 10-2012-0132551, filed on Nov. 21, 2012, in the Korean Intellectual Property Office, the disclosure of which is incorporated herein by reference in its entirety.

BACKGROUND (a) Technical Field

The present invention relates to a high-durability metal foam-supported catalyst which exhibits superior thermal conductivity and high temperature stability in order to inhibit degradation of catalytic performance in steam carbon dioxide reforming due to non-uniform temperature and a method for preparing same.

(b) Background Art

The catalysts mainly used in the field of reforming are a powder-type catalyst and a pellet-type support catalyst. Although the powder-type catalyst is superior in many aspects because of superior dispersibility, it is difficult to be used directly for industrial purposes. The powder-type catalyst is discharged from a reformer together with a reaction product. Accordingly, the powder-type catalyst may be accumulated near the outlet and block the flow tube. This makes the powder-type catalyst inapplicable to an industrial-scale reformer.

The pellet-type support catalyst is frequently used for industrial reformers. Although the performance of the pellet-type support catalyst is not better than that of the powder-type catalyst, it does not block the flow tube. Accordingly, it can be used for a longer period of time than the powder-type catalyst. But, the pellet-type support catalyst is disadvantageous in that the frequently used $\gamma$-$Al_2O_3$ pellet is brittle because of weak structural strength. Further, since the pellet-type support catalyst has a larger volume than the powder-type catalyst, the volume increases significantly when it is used for a large-capacity reformer.

All reforming reactions are sensitive to reaction temperature. But, when the existing powder-type catalyst or pellet-type catalyst is used, heat is not uniformly distributed throughout the reactor because of poor thermal conductivity.

Existing technologies for a catalyst support or a catalyst for hydrocarbon reforming are as follows. Korean Patent Application No. 10-2001-7005646 discloses a steam reforming catalyst which is supported on a mesh or a mesh-type material or the catalyst itself is of a mesh type. The mesh-type material may be wire, fiber mesh, metal felt, gauze, metal fiber filter, etc. Whereas this catalyst is limited for use in steam reforming, the present invention provides a catalyst for steam carbon dioxide reforming as described below. Also, whereas the catalyst itself is coated on a support in the above-described technique, an additional layer is coated on a metal foam support through wash coating and then a catalyst is disposed thereon in the present invention. As a result, a remarkable effect unexpectable from the existing catalyst is achieved.

Korean Paten Application No. 10-2004-7018719 discloses a reforming catalyst containing bismuth and phosphorus, wherein effective amounts of bismuth and phosphorus are uniformly distributed on a $\gamma$-alumina support and catalytically effective amounts of platinum, chlorine and, optionally, rhenium are deposited. Whereas this $\gamma$-alumina catalyst is for naphtha reforming, the present invention is different therefrom in that it provides a catalyst for steam carbon dioxide reforming, uses a metal foam, not $\gamma$-alumina, as a catalyst support and a nickel-based catalyst is used for steam carbon dioxide reforming.

Korean Paten Application No. 10-2007-7012528 discloses a support material containing silica, alumina, silica-alumina, titanic, titanosilicate, zirconia, zirconosilicate, etc. of various regular or irregular different shapes, including sphere, plate, cylinder, disc, ring, star and others. This invention relates to a catalyst support and a catalyst for production of alkenyl alkanoate, whereas the present invention relates to a catalyst support and a catalyst for production of hydrogen and carbon monoxide for Fischer-Tropsch (FT) synthesis. Whereas the catalyst of the patent application uses a noble metal catalyst such as palladium and gold, the present invention is different therefrom in that it uses a non-noble metal nickel for steam carbon dioxide reforming.

Throughout the specification, a number of publications and patent documents are referred to and cited. The disclosure of the cited publications and patent documents is incorporated herein by reference in its entirety to more clearly describe the state of the related art and the present invention.

SUMMARY

In order to prevent deterioration of catalytic performance due to non-uniform temperature in steam carbon dioxide reforming, the present invention provides a catalyst support utilizing the advantages of superior thermal conductivity and thermal dispersion of a metal foam support and a large specific surface area of a carrier material, which allows selective control of coating amount and the thickness of a support layer and prevents cracking on the support surface, using both the sol-gel method and the slurry method that have been used for coating of a metal foam support.

In an aspect, the present invention provides a nickel-based catalyst for steam carbon dioxide reforming wherein nickel is used as an active metal and washcoated alumina is used as a support. The support may be a metal foam such as a porous nickel metal, a porous copper metal, a porous silver metal, a porous aluminum metal, an iron-chromium alloy, etc. The metal foam support has a porosity of 80-97% and 10-110 pores per inch (PPI) and the nickel is impregnated in the metal foam support using a nickel precursor. In the high-durability catalyst, the alumina is washcoated with an amount of 0.1-30 wt % and the nickel is included in an amount of 0.01-10 wt % based on the support.

At present, steam carbon dioxide reforming is actively studied in relation to the gas to liquids (GTL) process. In general, the GTL process involves Fischer-Tropsch synthesis using a syngas ($H_2$/CO) obtained from reforming and preparation of petroleum fuel through upgrading. Generally, optimal performance is achieved when the syngas obtained from the reforming process has an $H_2$/CO ratio of 2.

In general, a cobalt (Co)- or iron (Fe)-based catalyst is frequently used in the Fischer-Tropsch process. The cobalt catalyst which has better performance exhibits the best performance when the molar ratio of the syngas is 2. However, steam reforming gives a syngas molar ratio of about 3 for dry reforming gives a syngas molar ratio of about 1. Accordingly, an additional process is necessary to adjust the molar ratio of the syngas to 2.

In contrast, the steam carbon dioxide reforming according to the present invention can provide a syngas molar ratio appropriate for the Fischer-Tropsch process without an additional process by controlling the supply rate of steam and carbon dioxide.

The steam carbon dioxide reforming reaction generally proceeds as follows.

$$CH_4 - H_2O \leftrightarrow 3H_2 - CO. \Delta H'_{298} = 206 kJ/mol \quad (1)$$

$$CO - H_2O \leftrightarrow CO_2 - H_2. \Delta H'_{298} = -41 kJ/mol \quad (2)$$

$$CH_4 - CO_2 \leftrightarrow 2H_2 - 2CO. \Delta H'_{298} = 247 kJ/mol \quad (3)$$

In general, pellet-type support catalysts are mainly used for industrial-scale reformers. Although the performance of the pellet-type support catalyst is not better than that of the powder-type catalyst, it does not block the flow tube. Accordingly, it can be used for a longer period of time than the powder-type catalyst. But, the pellet-type support catalyst is disadvantageous in that the frequently used $\gamma$-$Al_2O_3$ pellet is brittle because of weak structural strength. Further, since the pellet-type support catalyst has a larger volume than the powder-type catalyst, the volume increases significantly when it is used for a large-capacity reformer.

All reforming reactions are sensitive to reaction temperature. But, when the existing powder-type catalyst or pellet-type catalyst is used, heat is not uniformly distributed throughout the reactor because of poor thermal conductivity. In order to solve this problem, a metal foam catalyst having superior thermal conductivity may be used to uniformly distribute heat and improve the overall performance of reforming reaction.

Unlike the pellet-type catalyst, the metal foam of the present invention cannot be directly coated by active catalysts, using wet impregnation method. To solve this problem, a support layer of a carrier material (e.g., $Al_2O_3$) is formed on the metal foam support using the sol-gel method and the slurry method. But, the sol-gel method has the problem that loading amount on the support is not large and cracking occurs on the surface of the carrier material. Meanwhile, the slurry method has the problem that, although loading amount on the support can be increased, the carrier material is not dispersed uniformly on the surface and blocks the pores of the metal foam support.

Accordingly, the present invention provides a nickel-based catalyst for a reforming reaction allowing selective control of coating amount and thickness of a support layer using both the sol-gel method and the slurry method that have been used for coating of the metal foam support.

BRIEF DESCRIPTION OF THE DRAWINGS

The above and other objects, features and advantages of the present invention will now be described in detail with reference to certain exemplary embodiments thereof illustrated in the accompanying drawings which are given hereinbelow by way of illustration only, and thus are not limitative of the invention, and wherein.

DETAILED DESCRIPTION

Hereinafter, reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a nickel-based catalyst for steam carbon dioxide reforming wherein nickel is used as an active metal and washcoated alumina is used as a support. The support may be a metal foam such as a porous nickel metal, a porous copper metal, a porous silver metal, a porous aluminum metal, an iron-chromium alloy, etc.

The metal foam support may be selected from a group consisting of a porous nickel metal, a porous copper metal, a porous silver metal, a porous aluminum metal and an iron-chromium alloy. The porous metal may be an open-cell porous metal, a closed-cell porous metal or a high-melting-point porous metal. And, the metal foam support may have a random pore structure, a channel pore structure or a fiber pore structure.

Figure 1:
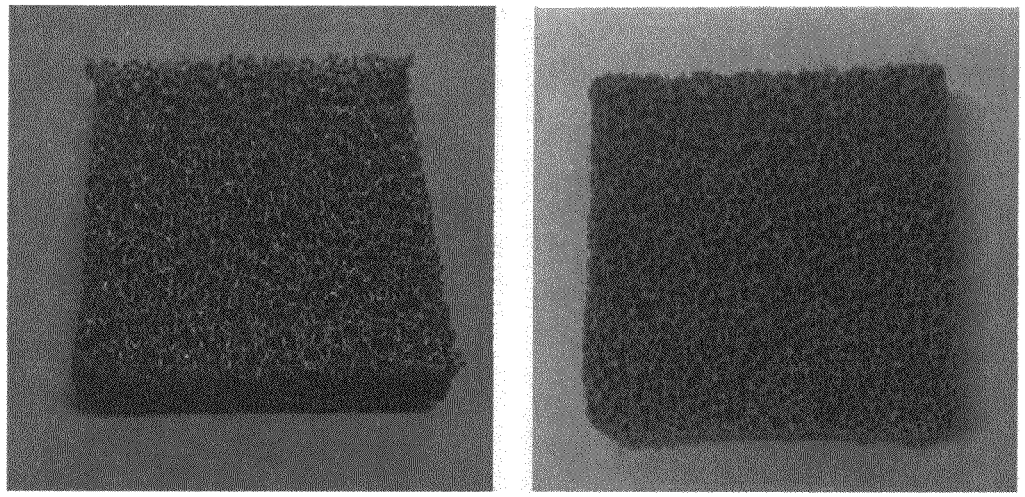
FIG. 1 shows photographs of a catalyst prepared according to the present invention.
Figure 1:
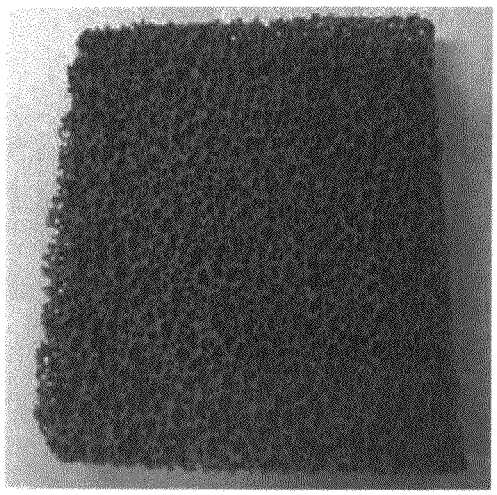

For catalyst supporting, a metal foam having advantages such as pore structure, low density, high temperature and chemical stability is used as a catalyst support. In an exemplary embodiment of the present invention, a Ni foam having 40 pores per inch (PPI) is used. Before preparing the catalyst, the Ni foam is washed in ethanol for 10 minutes using an ultrasonic cleaner and then immersed in 10 wt % HCl for 1 minute to remove impurities. In order to prepare a sol for wash coating, 20 cc of distilled water is heated to 85° C. and aluminum iso-propoxide (AIP, $[(CH_3)_2CHO]_3Al$) and polyvinyl alcohol (PVA, $CH_2CH(OH)$) are added to the heated distilled water and mixed for 30 minutes. After adding $HNO_3$ to the mixture solution to adjust pH to 2, followed by spontaneous drying for a predetermined time, $Al_2O_3$ powder is added. After adding nitric $HNO_3$ to maintain pH at 2, a sol-slurry solution is obtained. The Ni foam is washcoated by impregnating in the prepared sol-slurry solution. The washcoated Ni foam is sintered at 300° C. under an air atmosphere for 2 hours. After impregnating a nickel precursor in the sintered metal foam at 80° C. for 4 hours, followed by drying at 100° C. for about a day and then sintering at 800° C. under an air atmosphere, a Ni/$Al_2O_3$/Ni foam catalyst as shown in FIG. 1 is obtained.

The nickel precursor may be at least one compound selected from a group consisting of nickel nitrate, nickel bromide, nickel chloride, nickel acetate and nickel iodide.

Figure 2:
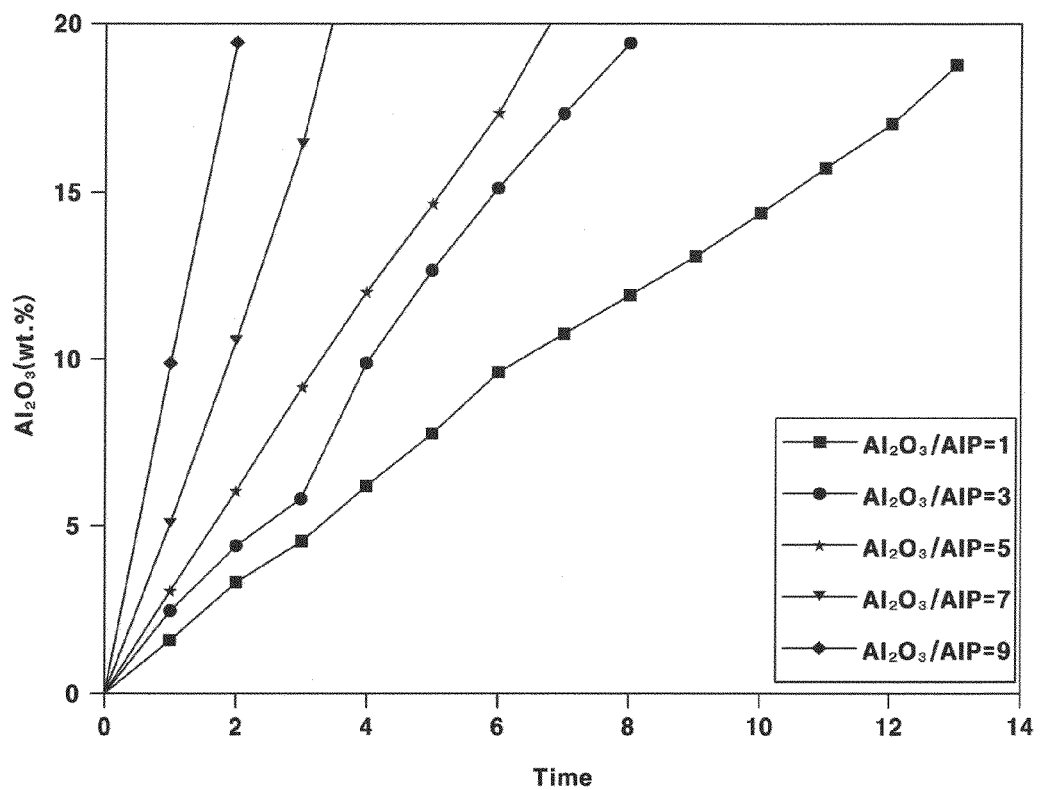
FIG. 2 shows washcoat weight fraction of catalysts prepared according to the present invention depending on the $Al_2O_3$/AIP molar ratio.

In metal foam coating, the mixing proportion with a binder material is important. If the amount of the binder material is too large or too small, coating may be not performed well or cracking may occur during the sintering. As seen from FIG. 2, the amount of washcoated $Al_2O_3$ changes depending on the molar ratio of $Al_2O_3$ and AIP. When the $Al_2O_3$/AIP molar ratio is small, about 13 or more times of wash coating is needed to adjust the content of $Al_2O_3$ to 20 wt %. But, when the $Al_2O_3$/AIP molar ratio is close to 9, 20 wt % of $Al_2O_3$ can be coated with only 2 times of wash coating.

Figure 3:
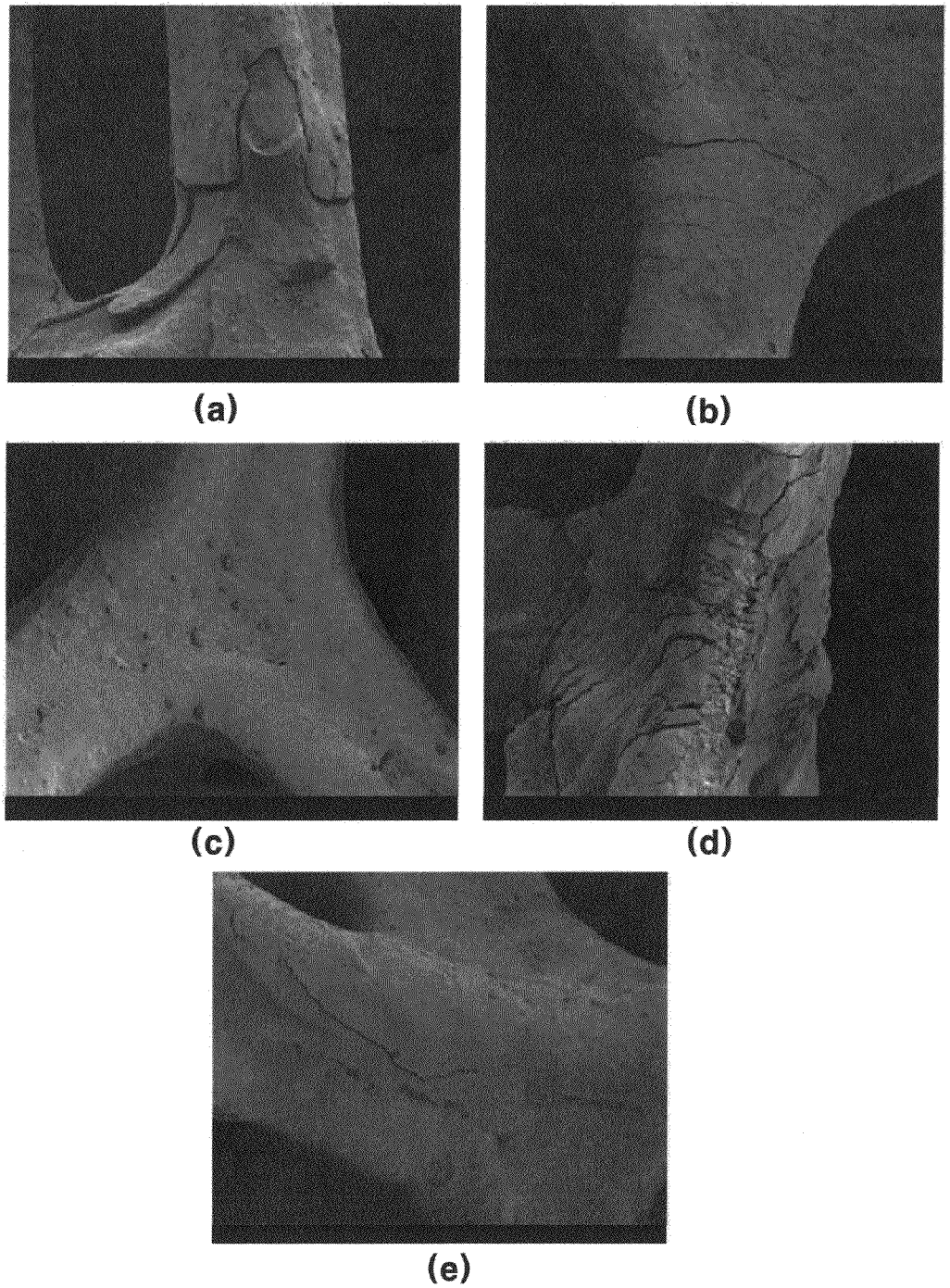
FIG. 3 shows SEM images of a catalyst prepared according to the present invention with different $Al_2O_3$/AIP molar ratios ((a) $Al_2O_3$/AIP=1, (b) $Al_2O_3$/AIP=3, (c) $Al_2O_3$/AIP=5, (d) $Al_2O_3$/AIP=7, (e) $Al_2O_3$/AIP=9)

The catalyst surface was observed using a scanning electron microscope (SEM) in order to investigate whether the $Al_2O_3$ was uniformly coated. As seen from FIG. 3, when the metal foam was washcoated under the condition with the $Al_2O_3$/AIP molar ratio of 3-5, specifically 5, there was no or least cracking. The number of wash coating until the same weight content was achieved with different $Al_2O_3$/AIP molar ratios is described in Table 1.

TABLE 1

| $Al_2O_3$/AIP molar ratio | 1 | 3 | 5 | 7 | 9 |
|---|---|---|---|---|---|
| Number of wash coating required to achieve the same weight content | 13 | 8 | 7 | 4 | 2 |

Figure 4:
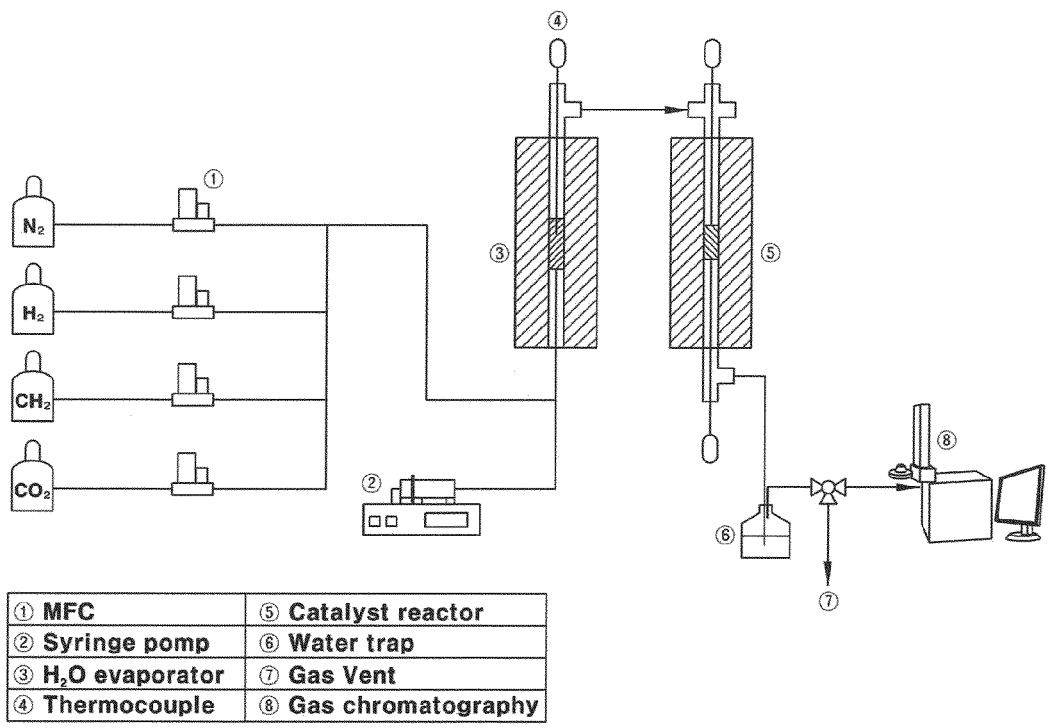
FIG. 4 schematically shows an experimental apparatus for steam carbon dioxide reforming (SCR) using a catalyst prepared according to the present invention. Methane, carbon dioxide, hydrogen for reduction and nitrogen as a carrier gas were used. Before being supplied to a main reactor, the gases are reacted while passing through reactors for generation of steam and mixing of the gases. The produced gas is analyzed by gas chromatography after passing through a water trap.

Steam carbon dioxide reforming was carried out using a fixed-bed reactor as shown in FIG. 4. A tubular SUS tube was used as the reactor. Reaction was performed after filling a Ni/$Al_2O_3$ Ni foam catalyst which had been reduced at 800° C. for 2 hours under a hydrogen atmosphere in the reactor. The steam carbon dioxide reforming reaction was conducted at 400-800° C. under normal pressure with a space velocity of 10,000 h$^{-1}$.

Figure 5:
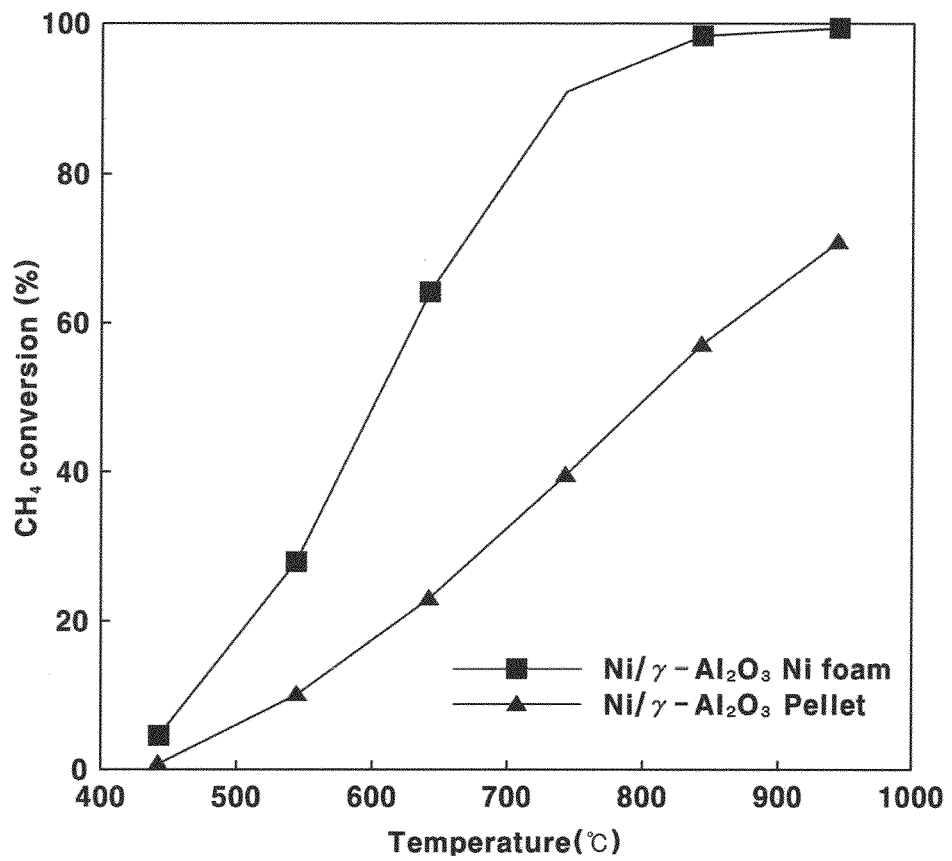
FIG. 5 shows $CH_4$ conversion rate depending on temperature when a catalyst prepared according to the present invention was used.
Figure 6:
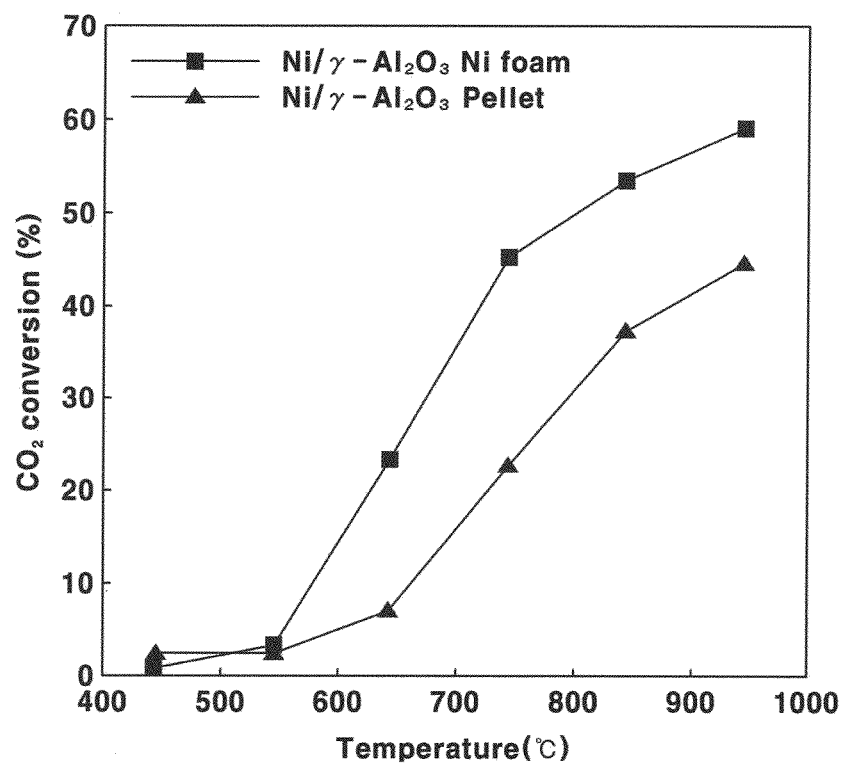
FIG. 6 shows $CO_2$ conversion rate depending on temperature when a catalyst prepared according to the present invention was used.

As seen from FIG. 5 and FIG. 6, $CH_4$ and $CO_2$ conversion rates increased as the reactor temperature increased. Especially, the catalytic performance was superior as compared to the existing pellet-type catalyst. It is because the metal foam catalyst provides more uniform temperature distribution and better material transport owing to better thermal conductivity than the pellet-type catalyst. Methane conversion rate of the catalyst of the present invention and the pellet-type catalyst at different temperatures is shown in Table 2.

TABLE 2

|  |  | Metal foam catalyst of the present invention ($Al_2O_3$/AIP = 3) | Metal foam catalyst of the present invention ($Al_2O_3$/AIP = 5) | Pellet-type catalyst |
|---|---|---|---|---|
| Methane conversion rate at different temperature | 400° C. | 3.5 | 4.5 | 0.8 |
|  | 500° C. | 31.6 | 27.8 | 10.0 |
|  | 600° C. | 73.0 | 64.0 | 23.0 |
|  | 700° C. | 96.6 | 90.8 | 39.5 |
|  | 800° C. | 99.6 | 98.4 | 57.1 |
|  | 900° C. | 99.9 | 99.5 | 70.9 |

Experimental Condition:

The catalyst was reduced at 800° C. under a hydrogen atmosphere before performing reaction.

Temperature range: 400-800° C.

Space velocity: 10,000 h$^{-1}$

Feed ratio: $CH_4$:$H_2O$:$CO_2$=1:2:1

The nickel-based catalyst for a reforming reaction of the present invention experiences no cracking on the support surface. With the advantages of superior thermal conductivity and thermal dispersion of the metal foam support and those of large specific surface area of the carrier material, it can be usefully used for a steam carbon dioxide reforming reaction.

The present invention has been described in detail with reference to specific embodiments thereof. However, it will be appreciated by those skilled in the art that various changes and modifications may be made in these embodiments without departing from the principles and spirit of the invention, the scope of which is defined in the appended claims and their equivalents.

What is claimed is:

1. A method for preparing a nickel-based catalyst for steam carbon dioxide reforming comprising nickel as an active metal and washcoated on alumina as a metal foam support, wherein the support has a porosity of 80-97% and 10-110 pores per inch (PPI), the nickel is included in an amount of 0.01-10 wt % based on the support and the alumina is washcoated with an amount of 0.1-30 wt %, comprising:
   supporting alumina on a metal foam and sintering; and
   supporting a nickel precursor on the alumina-supported metal foam support by an impregnation method and sintering again.

2. The method for preparing a nickel-based catalyst for steam carbon dioxide reforming according to claim 1, further comprising a sol-slurry solution for wash coating having an $Al_2O_3$/aluminum isopropoxide molar ratio of 1-5.

3. The method for preparing a nickel-based catalyst for steam carbon dioxide reforming according to claim 1, wherein the nickel precursor is at least one compound selected from the group consisting of nickel nitrate, nickel bromide, nickel chloride, nickel acetate and nickel iodide.

4. The method for preparing a nickel-based catalyst for steam carbon dioxide reforming according to claim 1, wherein the metal foam support is selected from the group consisting of a porous nickel metal, a porous copper metal, a porous silver metal, a porous aluminum metal and an iron-chromium alloy.

5. The method for preparing a nickel-based catalyst for steam carbon dioxide reforming according to claim 4, wherein the porous metal is an open-cell porous metal, a closed-cell porous metal or a high-melting-point porous metal.

6. The method for preparing a nickel-based catalyst for steam carbon dioxide reforming according to claim 1, wherein the metal foam support has a random pore structure, a channel pore structure or a fiber pore structure.

7. The method for preparing a nickel-based catalyst for steam carbon dioxide reforming according to claim 1, wherein the metal foam support is a nickel porous metal support.

8. A method for preparing a crack-free nickel-based catalyst for steam carbon dioxide reforming comprising nickel as an active metal and washcoated on alumina as a metal foam support, wherein the support has a porosity of 80-97% and 10-110 pores per inch (PPI), the nickel is included in an amount of 0.01-10 wt % based on the support and the alumina is washcoated with an amount of 0.1-30 wt %, comprising:
   supporting alumina on a metal foam and sintering; and
   supporting a nickel precursor selected from the group consisting of nickel nitrate, nickel bromide, nickel chloride, nickel acetate and nickel iodide on the alumina-supported metal foam support by an impregnation method and sintering again.

* * * * *